A. T. DUDLEY.
BALE FORMING PRESS.
APPLICATION FILED OCT. 19, 1915.
1,257,466.
Patented Feb. 26, 1918.
3 SHEETS—SHEET 1.
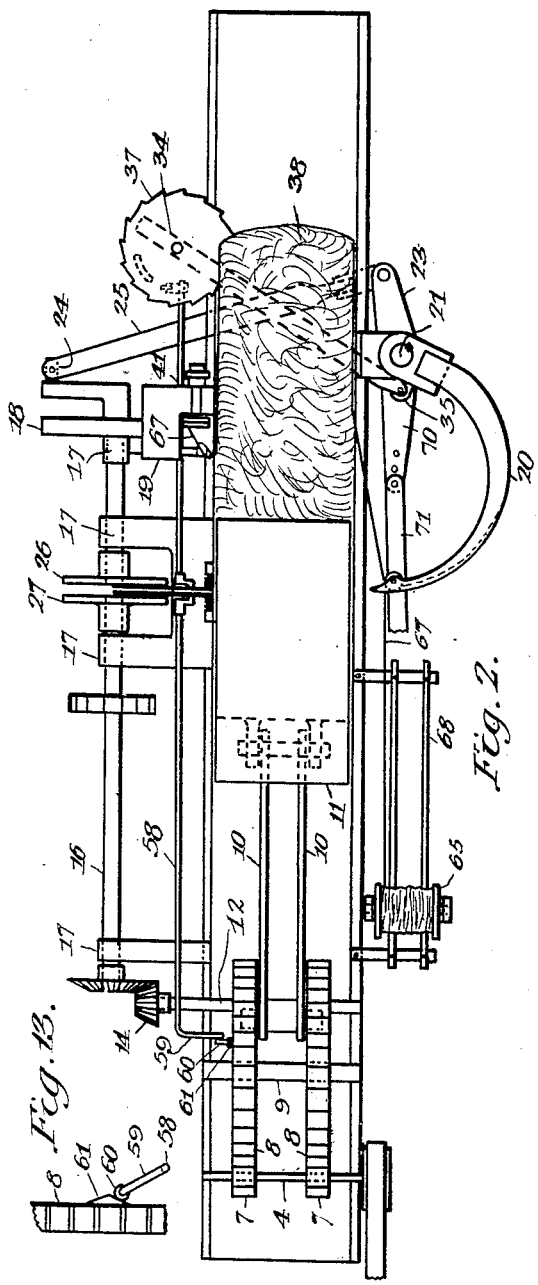
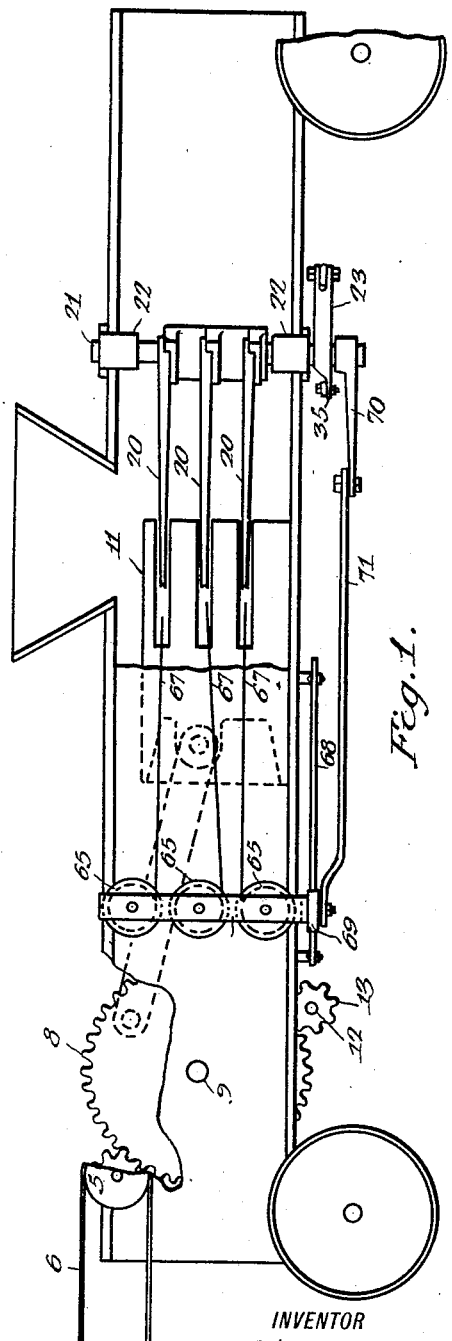
WITNESSES:
INVENTOR
A. T. Dudley
BY
Hardway & Cathey
ATTORNEY A. T. DUDLEY.
BALE FORMING PRESS.
APPLICATION FILED OCT. 19, 1915.
1,257,466.
Patented Feb. 26, 1918.
3 SHEETS—SHEET 2.
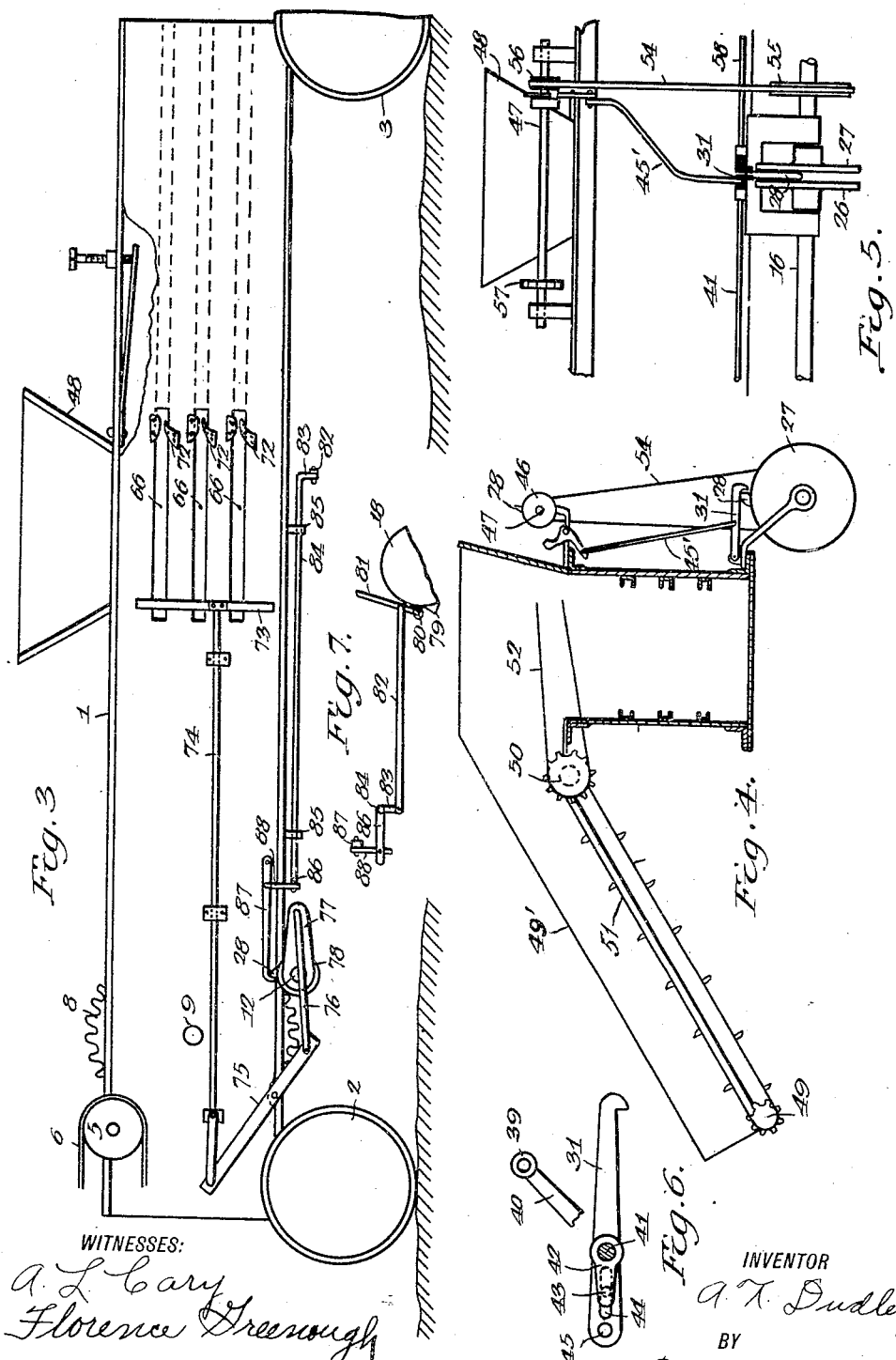

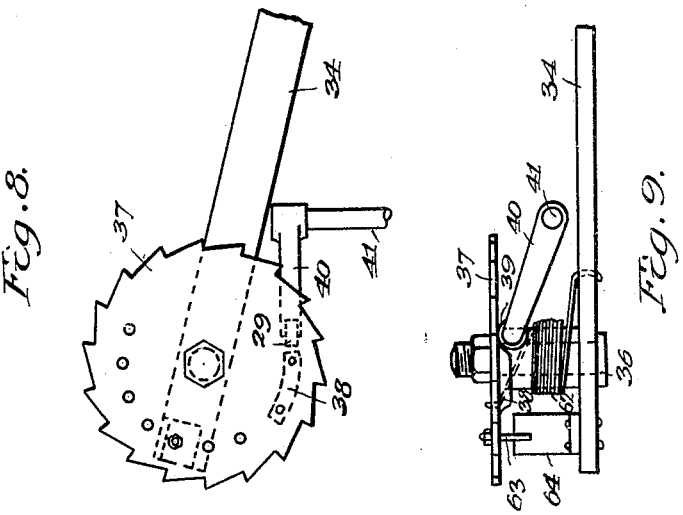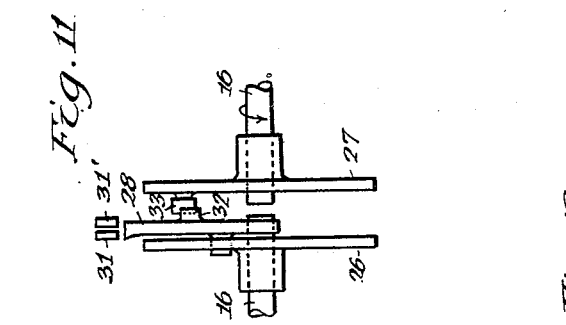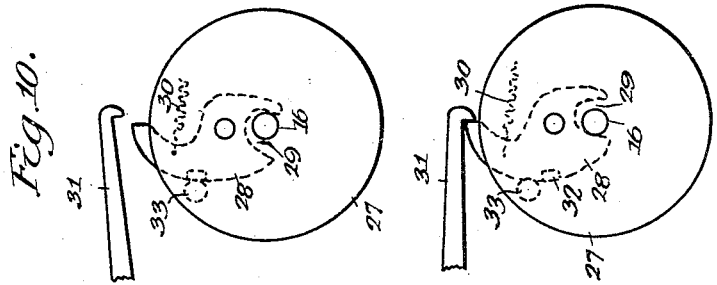

UNITED STATES PATENT OFFICE.

ANDREW T. DUDLEY, OF HOUSTON, TEXAS.

BALE-FORMING PRESS.

1,257,466. Specification of Letters Patent. Patented Feb. 26, 1918.

Application filed October 19, 1915. Serial No. 56,681.

*To all whom it may concern:*

Be it known that I, ANDREW T. DUDLEY, citizen of the United States, residing at Houston, in the county of Harris and State of Texas, have invented certain new and useful Improvements in Bale-Forming Presses, of which the following is a specification.

This invention relates to new and useful improvements in a bale forming press.

The object of the invention is to provide a device of the character described for forming hay and other similar materials into bales and automatically securing baling wires around the bale as formed.

Another object of the invention resides in the provision of a mechanism whereby the feeder, which carries the material and discharges it into the compress chamber, is automatically stopped while the bale is being tied.

A further feature of the invention resides in the provision of means for gradually unwinding the baling wires from the spools whereon it is stored and supplying said unwound wires to the needles as the same is taken up by them.

A still further feature of the invention consists of a mechanism whereby the wires are secured in transverse position across the baling chamber in advance of each bale thus preventing the feeding of the material into the chamber upon the wires and disarranging them.

With the above and other objects in view the invention has particular relation to certain novel features of construction, operation, and arrangement of parts, an example of which is given in this specification and illustrated in the accompanying drawings wherein:

Figure 1 is a side elevation of the device,

Fig. 2 is a plan view thereof.

Fig. 3 is a side elevation as shown in Fig. 1, with certain parts removed for the sake of clearness, Fig. 4 is a sectional end view of the device showing the feeder, Fig. 5 is a fragmentary view showing the mechanism for clutching and disengaging the parts of the drive shaft, Fig. 6 shows a fragmentary side elevation thereof, Fig. 7 shows a detail of the wire spacing mechanism, Figs. 8 and 9 show plan and side views respectively of the tripping mechanism, Figs. 10 and 11 show side and plan views respectively of the clutch employed in engaged position.

Fig. 12 shows said clutch disengaged.

Fig. 13 is a fragmentary view of one spur gear and arm.

Referring now more particularly to the drawings, wherein like numerals of reference designate similar parts in each of the figures the numeral 1 refers to a frame work which is formed into an oblong chamber wherein the bales are formed. This bale forming chamber has the operative mechanism of the press mounted thereon and is supported upon suitable carrier wheels 2 and 3. Rotatably mounted in suitable bearings carried by the chamber is the transverse shaft 4, having the pulley 5 fixed upon one end thereof which is rotated by the belt 6 from a suitable motor not shown. The shaft 4 has spur gear wheels 7, 7 fixed thereon in mesh with corresponding spur gear wheels 8, 8, which are fixed upon the shaft 9. This last mentioned shaft is rotatable in suitable bearings carried by the frame work and pivoted to each of the gear wheels 8, 8, eccentrically are the plunger rods 10, 10, which are connected to and drive the plunger 11. Rotatably mounted in suitable bearings underneath the chamber is the transverse shaft 12 having the spur gear wheel 13, fixed thereon in mesh with and driven by the gear wheels 8, 8. One end of the shaft 12 has the bevel pinion 14 fixed thereon and in mesh with a bevel gear wheel fixed upon one end of the shaft 16. This last mentioned shaft is formed in two sections, and is mounted in the bearings 17, 17, carried by side of the chamber 1, and fixed upon its other end is the disk 18, which is in operative connection with the twister 19 fixed to the side of the chamber. This twister forms the subject matter of a separate application and its details of construction will not here be described. It is provided however, to receive the baling wire which is carried around the bale by the needles 20, 20, 20, and secure the same around said bale. These needles are arcuate in form and are fixed to the vertical shaft 21 which is mounted in the bearings 22, 22, fixed to the side of the chamber 1 opposite the twister 19. Fixed to the lower end of the shaft 21 is the arm 23 whose free end is connected to the eccentric pin 24, associated with the disk 18 through the link 25, As the disk 18 rotates the needles 20 are alternately driven through and withdrawn from the baling chamber through the mechanism just described, and the baling wires thereby carried around the bale and secured by the twisters 19. The sections of the shaft 16 are arranged to be connected and disconnected by means of a clutch mechanism consisting of the disks 26 and 27 to the former of which the dog 28 is eccentrically pivoted. The inner end of this dog has the notch 29 through which the extended end of the shaft 16 projects. To the outer end of the dog one end of the pull spring 30 is attached and the other end of said spring is secured to said disk 26. The opposing face of the disk 27 has the stud 33 projecting out therefrom. When the hook 31 is engaged against the free end of the dog 28, the projection 32, carried by the dog 28, is swung around toward the center of the disk 27 and out of the path of the stud 33 and said disks may then rotate independently, but when the hook 31 is released from said dog the pull spring 30 forces the dog around into the position shown in Fig. 10, carrying the projection 32 of said dog into alinement with the stud 33 of the disk 27, and as said last mentioned disk rotates the inner end of said dog is locked against the projecting end of the shaft and the disk 27 is forced to rotate also, thereby clutching the two sections of the shaft together. The clutches employed in the device as hereinafter referred to are of the type just described, and corresponding parts of the different clutches have been designated by the same reference characters.

A bar 34 extends transversely under the baling chamber. One end of this bar is pivoted to the extended end 35 of the arm 23 and the other end thereof has a stub shaft 36 secured thereto which carries the rotatable serrated disk 37, which is normally in engagement with the forming bale 38 and said disk is rotated by said bale as it moves along through the chamber. The under face of this disk has the cam 38, arranged in the path of the roller bearing 39 which is carried by the free end of the arm 40. This arm is fixed upon one end of the rod 41, which extends alongside the chamber and is rotatable in suitable bearings carried by said chamber. To the other end of the rod 41 the arm 43 is fixed, whose free end has a pin which projects through an oblong slot 44 in the hook 31. The hook 31 is pivoted at the point 45 and when the shaft is rotated the free end of the arm 42 is lifted, elevating the hook 31 through the pin. The elevation of the hook 31 releases the dog 28 and also operates through the link 45' to engage a similar hook of the clutch 46 with the dog 28 of said last mentioned clutch and thereby disengage the feeder, hereinafter described, from its driving shaft 47. This feeder extends laterally relative to the compress chamber and is in alinement with and feeds the material into the hopper 48. It consists of the chute 49', having the transverse rollers 49 and 50, at the lower and upper ends respectively thereof over which the endless apron 51 revolves. The roller 50 is driven from the shaft 47 through the sprocket chain 52 and the apron is driven from said roller 50 through the sprocket chains as 53. The shaft 47 is formed of two sections which are clutched together and disengaged by the clutch 46 and this shaft is driven from the shaft 16 through the sprocket chain 54 which operates over the sprocket wheels 55 and 56, fixed respectively on the shaft 16 and one section of the shaft 47. On the other section of the last mentioned shaft is fixed the sprocket wheel 57 which drives the sprocket chain 52. Alined with the rod 41 is a similar rotatable rod 58 which is mounted in suitable bearings and one end of which has the arm 59, which carries the roller bearing 60. This bearing is in the path of the cam 61 carried by the adjacent face of the gear wheel 8. When said cam contacts with the bearing 60 it operates to partially rotate the rod 58 and disengage the hook 31' from the dog 28. This hook is actuated by the rod 58 through a mechanism similar to that shown in Fig. 6. The wheel 8 rotates with considerable speed and causes the hook 31' to play idly, but when the hook 31 is also disengaged, the dog 28 is released from both of said hooks and is pulled forwardly by the spring 30 and the projection 32 carried into the path of the stud 33 thereby causing the clutch to engage and forcing the sections of the shaft 16 to rotate together. The disk 18 is thereby rotated and the needles 20 driven through the baling chamber into coöperation with the twisting device 19 and the wires are by said device secured around the bale. When the shaft 21 partially rotates to drive the needles through the baling chamber a thrust is imparted to the bar 34 carrying the disk 37 out of engagement with the bale 38 and releasing said disk to the influence of the spring 62 which is coiled around the shaft 36 and the disk 37. A stud 63 depends from the disk 37 in whose path is the stop 64 which projects up from the bar 34 and which limits the backward movement of said disk. During the formation of the bale, as it moves along the teeth of the disk 37 engage therewith and the disk is rotated overcoming the tension of the spring 62. At the completion of the bale the cam 38 contacts with the roller 39 operating, as hereinbefore explained, to trip the hook 31 and disengage the clutch 46 to suspend the operation of the feeder during the process of tying. Immediately thereafter the cam 61 contacts with the roller bearing 60 with the result that the hook 31 is released from the dog 28 and the clutch uniting the parts of the shaft 16, is engaged, putting the needles and twisting device in motion, through the disk 18. This clutch remains in engagement during one rotation of the shaft 16 which carries the operative mechanism back into its original position. As soon as the cams 38 and 61 pass their respective rollers 39 and 60 the hooks 31 and 31' are released and drop back to their original position to engage the dog 28 and declutch the sections of the shaft 16. The movement of the tying mechanism and needles is thereby suspended and the clutch 46 engaged and the feeder again set in motion.

The movement of the needles through the chamber is very swift and if the spools upon which the wire is wound are stationary a direct pull from the needles will cause the spools to spin and give off too much slack wire and for that reason movable spools have been provided which move toward the needles as they pass through the chamber in carrying the wire around the bale. These spools are indicated by the numerals 65, 65, 65 rotatably mounted in the frame 66. The free ends 67, 67, 67 of the wires pass through the needle eyes and on through the compress chamber and engage with the twisting device. The frame 66 is slidably mounted upon a track 68 by means of the sliding bearing 69 upon which the frame 66 is mounted. The lower end of the shaft 21 has an arm 70 fixed thereon and pivoted at its respective ends to the free end of said arm and the bearing 69 is the link 71. When the shaft 21 rotates to drive the needles through the chamber the free end of the arm swings around exerting a pull on the link 71 causing the spools to move toward the needles, creating a slack in the unwound wires which is immediately taken up by the needles thus preventing a sudden pull directly against the spools. When the shaft 21 reverses the spools are forced back to their original position gradually unwinding the wire from the spools and holding it in readiness to be delivered to the needles when the next bale is tied.

Before beginning the formation of a bale it is necessary to properly space the wires across the chamber to prevent some of the loose hay from falling upon the wires and disarranging them and from falling between the bales. The sides of the baling chamber are formed of open cage work, as illustrated in Fig. 3, to permit the wires and needles to pass therethrough, and secured to the side of the chamber opposite the twisters 19 are the hooks 72, 72, 72. A vertical spacer bar 73 is slidably mounted on the side of the baling chamber connected to which is the push rod 74. One end of the lever 75 is pivoted to this rod and the other end is pivoted to the link 76 which is connected to the free end of the arm 77 fixed to the driven member of the clutch 78. The disk 18 has a peripheral cam 79 arranged to contact with the roller bearing 80 carried by the lower end of the lever 81 whose upper end is connected to the frame of the machine. One end of the link 82 is pivoted to the lever 81 and the other end thereof is pivoted to the free end of the arm 83 which depends from the rod 84. This rod is rotatably mounted in suitable bearings 85, 85 and has also the arm 86 fixed thereto and extending at right angles therefrom. Pivoted to the side of the chamber is the hook 87 which normally engages over the free end of the dog 28 forming a part of the clutch 78. A link 88 has its respective ends pivoted to the free end of the arm 86 and the hook 87. When the cam 79 contacts with the bearing 80 it operates through the mechanism just described to lift the hook 87 and release the dog 28 thereby causing the driven member of the clutch 78 to be clutched with and rotated from the shaft 12. When the cam 79 passes the bearing 80 said bearing drops back to its original position and the hook 87 drops into position to engage with the dog 28 and to declutch the driven member of the clutch 78 from the shaft 12. During the rotation of said driven member the arm 77 swings around performing a complete rotation and operates through the lever 75 and the push rod 74 to drive the spacer bar 73, against the wires 67 and carry them into engagement with the hooks 72 and then restore the spacer bar to its original position.

In operation the material to be compressed is manually delivered to the feeder and by it delivered into the hopper 48 from which it passes into the compress chamber in front of the plunger 11. The plunger reciprocates back and forth and compresses the bale 38 forcing it along toward the discharge end of the chamber. As the bale moves along the disk 37 is rotated, overcoming the resistance of the spring 62 until the cam 38 contacts with the roller 39 and through the rod 41 and the mechanism, hereinbefore described, actuated thereby releases the clutch 46 and stops the feeder during the tying of the bale. The cam 61 then contacts with the roller 60 operating through the arm 59 and the rod 58 and the mechanism actuated thereby to release the dog 28 with the result that the sections of the shaft 16 are clutched together and the disk 18 set in motion. As hereinbefore explained, the rotation of this disk operates through the link 25 to drive the needles 20 into coöperation with the twisters 19, as well as to operate said twisters. The influence of the link 25, exerted through the arm 23, on the shaft 21 operates through the arm 70 and the link 71 to move the spools along their track toward the needles gradually delivering the unwound wire to the needles as they move toward the twisters. When the disk 18 has performed one rotation it is declutched from the driving section of the shaft 16 by reason of the fact that when the cam 38 has passed the bearing 39 the hook 31 will be permitted to drop back in position to engage the dog 28 with the result that the sections of the shaft 16 will be declutched and when said disk has turned to its original position the pull of the link 25 exerted against the arm 23 will operate to withdraw the needles 20 and carry the disk 37 again into position to engage with the forming bale. Immediately after the completion of the tying of a bale and the withdrawal of the needles the cam 79 operating against the roller bearing 80 disengages the hook 87 from the dog 28 of the clutch 78, through the mechanism hereinbefore described thereby engaging the driven member of said clutch with the shaft 12. The arm 77 is thereby rotated operating, through the mechanism connected therewith, to force the spacer bar 73 against the wires 66 and carry said wires into engagement with the hooks 72 whereby the wires are held in transverse position so that the material of the next succeeding bale will all fall behind said wire.

What I claim is:—

1. A device of the character described including a compress chamber, a plurality of wire twisting devices arranged on one side thereof, a plurality of needles pivoted upon the opposite side thereof and provided to carry securing wires across said chamber, a plunger arranged to reciprocate in the chamber, a driving mechanism in operative connection with said plunger, means for operatively connecting said driving mechanism with said twisters and needles, and a mechanism for preventing excessive tension on the wires as the needles are driven through the chamber.

2. A device of the character described including a compress chamber, a plurality of wire twisting devices, a corresponding number of needles, a plunger in said chamber, a means for reciprocating the plunger, a mechanism for driving the needles back and forth through the chamber to carry securing wires into engagement with the twisters, and for also operating said twisters, means for connecting said mechanism with and disconnecting it from said plunger reciprocating means, and a mechanism for preventing excessive tension on the wires as the needles are driven through the chamber.

3. A device of the character described, including a compress chamber, a plurality of wire twisting devices arranged adjacent thereto, corresponding needles arranged to co-act with said twisters, a plunger in said chamber, driving means for reciprocating said plunger, a mechanism for driving the needles into coöperation with said twisters, said mechanism also being operatively connected with said twisters, means for connecting said mechanism and disconnecting it from said driving means, and mechanism for preventing excessive tension on the wire as the needles are driven through said chamber.

4. A device of the character described including a compress chamber, a plurality of wire twisting devices arranged adjacent thereto, corresponding needles arranged to coöperate with said twisters, a plunger in said chamber, driving means for reciprocating said plunger, a mechanism for driving the needles into coöperation with said twisters, said mechanism also being operatively connected with said twisters, means for connecting said mechanism with and disconnecting it from said driving means, a feeder arranged to deliver material into the chamber, and means actuated by said mechanism to temporarily suspend the operation of the feeder, while the needles are coöperating with the twisters.

5. A device of the character described including a compress chamber, a plurality of wire twisting devices arranged adjacent thereto, corresponding needles arranged to coöperate with said twisters, a plunger in said chamber, driving means for reciprocating said plunger, a mechanism for driving the needles into coöperation with said twisters, said mechanism also being operatively connected with said twisters, a clutch for engaging said mechanism with and disengaging it from said driving means, a means actuated by the bale as it moves through the chamber, and operating to disengage said clutch, a feeder driven by said driving means and arranged to deliver material into the chamber, said bale actuated means also having an operative connection with the feeder driving means and temporarily disconnecting the feeder from its driving means upon the completion of each bale.

6. A bale forming press including a compress chamber, a plurality of twisters arranged adjacent thereto, a corresponding number of needles pivoted to the side of the chamber opposite the twisters, means for driving said needles through the chamber into coöperation with the twisters, storage spools carrying baling wire, and means for moving said spools toward the needles as they are driven through said chamber.

7. In a bale forming press a compress chamber, a needle pivoted to one side thereof, means for driving the needle back and forth through the chamber, a storage spool carrying baling wire, the free end of said wire passing through the eye of said needle and across said chamber, a movable frame in which said spool is mounted, a mechanism moving said spool to unwind the wire therefrom while the needle is being withdrawn from the chamber, said mechanism delivering the unwound wire to the needle as the needle moves across the chamber to carry the same around the bale.

8. A bale forming press including a compress chamber, a twister on one side thereof, a needle pivoted to the opposite side thereof, means for driving the needle into coöperation with and withdrawing it from the twister, a storage spool carrying baling wire, the free end of the wire passing through the needle eye and being secured to the twister, a movable frame in which the spool is mounted, a means in operative connection with the needle driving means for moving the spools back and forth as the needle is driven into coöperation with and withdrawn from the twister.

9. A bale forming press including a compress chamber, a twister arranged adjacent thereto, a needle pivoted at the opposite side of the chamber from the twister, means for driving the needle into coöperation with and withdrawing it from the twister, a spool carrying baling wire, the free end of said wire passing through the needle eye and across the chamber and being secured to the twister, an engaging means carried by the side of the baling chamber and arranged opposite the twister and a spacing mechanism engaging with the wire and forcing it into engagement with said engaging means after the needle has been withdrawn from the twister.

10. A bale forming press including a compress chamber, a twister arranged adjacent thereto, a needle pivoted to the chamber opposite the twister, a means for driving the needle into coöperation with and withdrawing it from the twister, a storage means for carrying wire, the free end of the wire passing through the eye of the needle and across said chamber and being secured to the twister, a movable frame work in which the storage means is mounted, a mechanism moving the frame work and storage means toward the needle as it is driven into coöperation with the twister and for reversing the movement thereof as the needle is withdrawn, a wire engaging means opposite the twister and a spacing mechanism engaging with the wire and forcing it into said engaging means after the needle has been withdrawn from the twister.

11. A device of the character described including a compress chamber, a wire twisting device on one side thereof, a needle on the opposite side thereof provided to carry a securing wire across said chamber, a plunger arranged to reciprocate in the chamber and compress the material therein, a driving mechanism in operative connection with said plunger, means for operatively connecting said driving mechanism with said twister and needle and clutch control means operated by the driving mechanism to predetermine the time of the connection of said mechanism with said twister and needle.

12. A bale forming press including the combination with a compress chamber and a plunger which reciprocates back and forth therein, of a binding mechanism, a driving shaft, a mechanism for operatively connecting said shaft and binding mechanism, a means for locking said connecting mechanism against movement, a means in engagement with and controlled by the bale moving in said chamber for releasing said locking means, said bale controlled means being in turn controlled and released from the engagement with the bale, by the binding mechanism.

13. A bale forming press including a compress chamber, a twister arranged adjacent thereto, a needle pivoted to the opposite side of the chamber from the twister, means for driving the needle into coöperation with and withdrawing it from the twister, means whereby the free end of the baling wire passes through the needle eye and across the chamber and is secured to the twister, and a spacing mechanism arranged to operate against the wire after the needle has been withdrawn from the twister to space the wire relative to the compress chamber.

14. A bale forming press including a compress chamber, a twister arranged adjacent thereto, a needle pivoted at the opposite side of the chamber from the twister, means for driving the needle into coöperation with and withdrawing it from the twister, means whereby the free end of the baling wire passes through the needle eye and across the chamber and is secured to the twister, a spacing mechanism arranged to engage against the wire and space it relative to the chamber, a means for driving said spacing mechanism, a clutch for connecting said mechanism with and disconnecting it from its driving means and a means controlled by the binding mechanism for predetermining the engagement and disengagement of the spacing mechanism with its driving means through said clutch.

15. In a bale forming press, a compress chamber, a needle pivoted to one side thereof, means for driving the needle back and forth through the chamber, means whereby the free end of the baling wire passes through the eye of said needle and across said chamber, a movable frame carrying the baling wire, a mechanism for unwinding the wire and delivering the unwound wire to the needle, as the needle moves across the chamber to carry the same around the bale.

16. A bale forming press including a compress chamber, a mechanism for compressing material in said chamber into a bale, a binding mechanism for securing tying wire around the bale, a spacing mechanism arranged to operate against the wire to space the same relative to said chamber, a clutch operatively connecting the spacing mechanism with and disconnecting it from the compressing mechanism and means controlled by the binding mechanism for disengaging said clutch.

17. A bale forming press including a compress chamber, a mechanism for compressing material in said chamber into a bale, a binding mechanism for securing tying wire around the bale, a clutch for connecting the compressing mechanism with and disconnecting it from the binding mechanism, a means in engagement with, and actuated by, the bale and operating to disengage said clutch, said means being in operative connection with, and disengaged from the bale by, the binding mechanism, 18. A bale forming press including a compress chamber, means for carrying baling wire through said chamber, wire storage means, and means for moving said wire storage means toward the wire carrying means as the latter is performing an operative movement.

19. A bale forming press including a compress chamber, means for carrying baling wire through said compress chamber for baling purposes, and wire spacing means for operating on the baling wire after it has been carried through said compress chamber.

In testimony whereof I have signed my name to this specification in the presence of two subscribing witnesses.

ANDREW T. DUDLEY.

Witnesses:
ANNIE CARY,
FLORENCE GREENOUGH.

Copies of this patent may be obtained for five cents each, by addressing the "Commissioner of Patents, Washington, D. C."